W. J. WILSON.
DENTAL ARTICULATOR.
APPLICATION FILED MAR. 17, 1919.
1,322,386.
Patented Nov. 18, 1919.
2 SHEETS—SHEET 1.
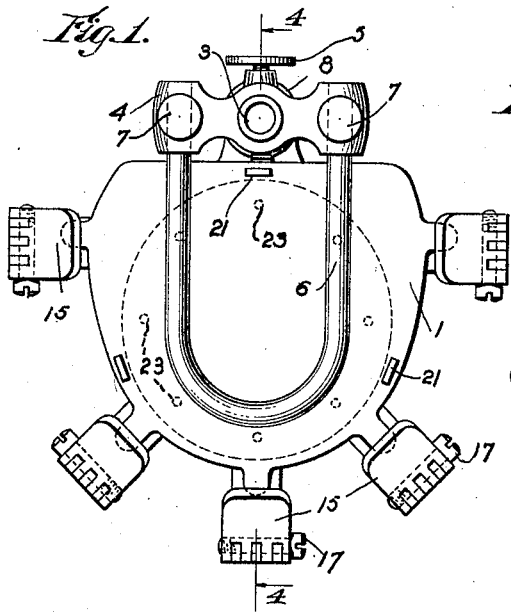
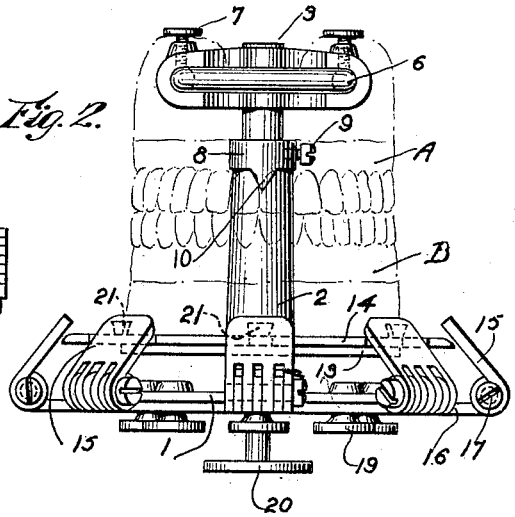
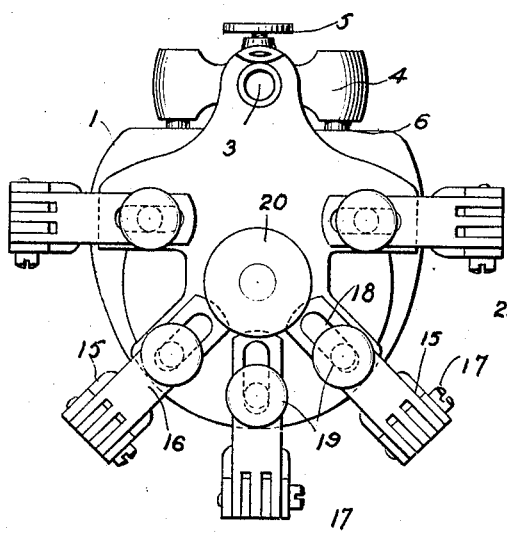
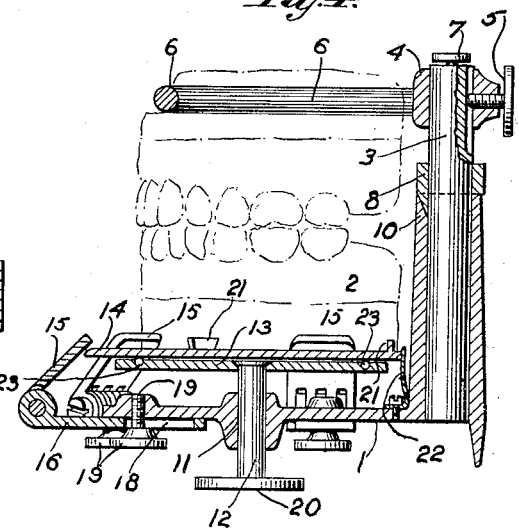
WITNESSES
INVENTOR
WALTER J. WILSON,
BY
ATTORNEYS

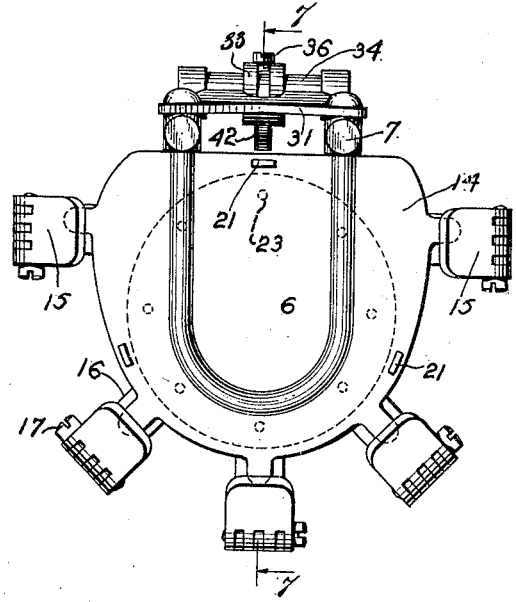
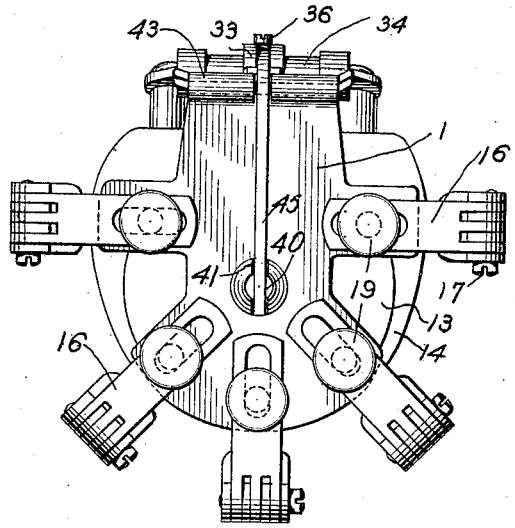
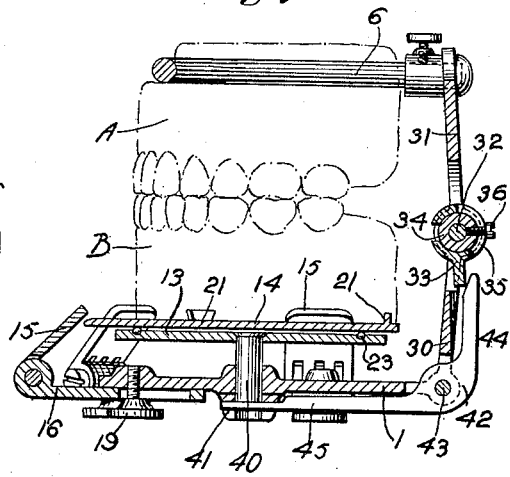

UNITED STATES PATENT OFFICE.

WALTER J. WILSON, OF PETERSBURG, INDIANA.

DENTAL ARTICULATOR.

1,322,386.    Specification of Letters Patent.    Patented Nov. 18, 1919.

Application filed March 17, 1919. Serial No. 283,048.

*To all whom it may concern:*

Be it known that I, WALTER J. WILSON, a citizen of the United States, and a resident of Petersburg, county of Pike, and State of Indiana, have invented a new and Improved Dental Articulator, of which the following is a full, clear, and exact description.

This invention relates to articulators. More particularly the invention relates to dental apparatus used for grinding and finishing artificial tooth sets.

In the modern art of dental mechanics complete sets of teeth comprising both upper and lower jaw sections are often constructed and installed in a patient's mouth. It becomes necessary to finish these artificial tooth sets by grinding or abrading the contacting faces and edges of the co-acting teeth until they will positively and accurately register one with the other as effectively as that of a well shaped set of natural teeth.

Therefore, an object of this invention is to provide the design of a dental apparatus for carrying out the aforesaid purpose, and which will embody means for supporting and holding the teeth for the grinding process. A particular object is to provide an articulator embodying means for holding one tooth set or cast in a movably engaged relation with the other tooth set or cast, and impart to the engaged teeth a delicate and well directed articulating motion for grinding and shaping the engaged teeth edges until they register accurately one with the other.

A particular object of this invention is to provide such a dental apparatus as described as will impart a natural articulating movement to the engaged tooth sets by hand movements imparted to the apparatus by a dental mechanic or other operator. Another object of the invention resides in certain means for securely holding one tooth cast in connection with other means for supporting another tooth cast, the latter being articulated by delicate movements imparted thereto by the operator. A feature of the invention resides in specially designed articulating element comprising a frictionally operated cast holding plate and certain adjustable retaining means for confining the cast holding plate in a limited range of articulated movement.

In my application for patent filed March 17, 1919, Serial Number 283,049, I have shown, described and claimed a power transmission apparatus which may be employed to operate this or other dental articulators. The power transmission apparatus will be used where it is desirable to employ a power drive instead of operating the dental articulator by hand.

With other and further objects in view the invention has relation to a certain combination and arrangement of parts, an example of which is described in the following specification, pointed out in the appended claims and illustrated in the accompanying drawings, wherein:

Figures 1 and 2 respectively illustrate a plan and side elevational view of the assembled dental articulator.

Fig. 3 shows an underneath view of the apparatus.

Fig. 4 is a sectional view taken upon the line 4—4 of Fig. 1.

Figs. 5 and 6 respectively illustrate a plan and underneath view of the articulator; and Fig. 7 illustrates a sectional view taken upon the line 7—7 of Fig. 5.

Referring now more particularly to the drawings, wherein the same parts throughout the several views are designated by reference characters of the same denomination, the numeral 1 points out a base plate upon which the related parts of the apparatus are mounted. A tube receptacle 2 is integrally formed with the base plate and extends vertically therefrom, and receives the post or shaft 3, which is slidably confined in said tube. A bracket 4 is slidably confined upon the upper portion of the post. A thumb adjusting screw 5 is screw threaded into the bracket and engages the post in such a manner that the bracket may be adjusted in any position upwardly or downwardly on the post. A yoke frame 6 is slidably confined in the bracket 4 and securely held in rigid relation thereto by adjustable thumb screws 7. A substantially parallel relation exists between the yoke and base, and the yoke may be adjusted inwardly or outwardly through the use of the thumb screws 7, as aforesaid. A sleeve or ferrule 8 is provided with a screw 9 and placed upon the post 3 and securely engaged thereto by the screw. The ferrule has formed thereon a locating or centering dowel 10 adapted to engage a notch formed in the upper portion of the tube for receiving the dowel.

The base plate is provided with a bored boss 11. An articulator shaft 12 is journaled within this bore and adapted to undergo reciprocating and rotating motion imparted by the operator. The articulating shaft has fixed to its upper extremity a rotatable plate 13. A tooth cast holder plate 14 is loosely placed upon the rotating table. This plate 14 has no positive connection with the member 13, but is confined thereon and adapted to receive articulating motion communicated to it from other parts. A set of retaining planes 15 are mounted on the base. These planes comprise plates disposed at an angle about the periphery of the base. The members 15 are pivoted upon adjustable slides 16 by inserting the planes or plates 15 into said members 16 in a hinged relation, and upon the pivot screws 17. The adjustable slides are slotted as designated at 18. A knurled adjusting screw 19 is inserted in the slot and screw threaded into the base to hold the correlated retainer plane and adjustable slides in a positively immovable relation with the base. A knurled flange 20 is fixed to the articulator shaft. Lugs 21 are formed on the cast holder plate 14. An actuating spring 22 is fastened to the base and stands in contiguous relation to the cast holder. This spring will be formed of a piece of flexible leaf steel and function as hereinafter described. Several ball-bearings 23 may be inserted in ball seats formed in the rotatable plate 13. as illustrated, and thus slightly space apart the cast holder from the rotatable plate.

The artificial tooth sets or casts which are to be articulated in this dental apparatus are illustrated in dotted lines on several of the views. The upper jaw tooth cast A is secured to the yoke frame 6 in any suitable manner known in the art of dentistry. The dotted circle shown in Figs. 1 and 5 points out the approximate position of the tooth casts in relation to the apparatus. After the cast is placed in the position shown by the circle plastic material will then be built around the lugs and cemented and joined to the tooth casts. The cast may be inserted in the frame and built onto and incased within the frame by the use of plastic material, and then set aside to dry, after which the frame and correlated yoke may be placed upon the post 3 in any adjusted position or distance above the base. The lower jaw tooth set or cast B is mounted on the cast holder 14 in a manner similarly described above by placing the plastic cast upon the lugs 21 and incasing said lugs within the cast by the use of plastic material. The cast holder plate 14 may be removed from the apparatus simply by lifting it off of its mountings from the plate 13. The tooth cast B will then be fixed thereto as above described, and replaced in the apparatus in position shown in the drawings.

The screws 17 will be loosened and the retaining planes 15 properly adjusted in relation to the cast holder plate. Proper adjustment of the plane 15 implies that the whole set of said retaining planes will be so related to the cast holder 14 that said holder may be free for slight forward and lateral motion about and over the ball-bearings and within the confines of retaining means. The actuating spring 22 will continually impress a slight forward motion to the holder, and the holder will in turn bump or rub against the retaining planes. The foregoing operation is imparted to the moving parts through the action of the operator as he loosely holds the apparatus in one hand and simultaneously imparts a slight rotating and reciprocating motion to the articulator shaft 12 by the knurled thumb flange 20. It is seen how the lower tooth cast is free to undergo motion in practically all directions, and further how the range of motion is increased or decreased by the several adjusting means.

As the articulating operation continues the mechanic will keep some form of abrasive, such as glycerin and carborundum, painted into the engaged teeth for the purpose of shaping, cutting and forming the tooth edges until they accurately and positively engage one with the other similar to the engagement of masticating edges of well shaped natural teeth.

The foregoing description is a disclosure of the preferred form of the invention, and a following description will now be given of a modified form of the invention comprising a double articulating means.

The modified form of the invention is disclosed in Figs. 5, 6 and 7 where the principal parts of the apparatus have a similar design and function.

In the case of the modified form the base 1 is provided with an upright support 30. A rocker arm 31 is pivoted on the upright 30 as pointed out by the numeral 32, which represents a shaft or pivot pin. This rocker arm comprises the upper section 31, and lower part 33. The upper section is integrally formed with the sleeve 34. This sleeve is pivoted on shaft 32 as hereinbefore described. The lower member 33 is loosely confined upon the sleeve 34 and provided with a slot 35 cut therein as illustrated in the sectional view Fig. 7. A screw 36 is threaded into the sleeve, gripping and engaging the member 33 until it is securely set in fixed relation with the sleeve. Thus the part 33 of the rocker arm is adjustable by loosening the screw 36 and placing the arm 33 in the desired position.

The cast holder frame 6 is secured to the upper extremity of the rocker arm in a similar manner hereinbefore described. The articulator element in this modified form has the same design, and comprises the cast holder plate 14 mounted on the rotatable plate 15. The same adjustable retaining means are used in this apparatus as in the preferred form. An articulating shaft 40 is fixed to the rotatable table and journaled in the base plate. A slot 41 is formed in the boss of the plate, and the lower extremity of the articulator shaft, when in its upwardly limited position, lies in alined position with the said slot. A bell-crank articulating means 42 is pivoted on a pin 43. This pin is fixed in the base and the bell-crank is journaled on the pin as illustrated. The upper arm 44 of the bell-crank operates in contiguous relation with the rocker arm, and the horizontal arm 45 of the bell-crank is confined within the slot 41 and adapted to impart vertical reciprocating motion to the articulating shaft.

This form of the articulator may be grasped in each hand by the operator and both tooth sets receive the articulating action by operating the upper case. This modified form discloses an effective double acting articulator which imitates the motion of the upper and lower jaw. Either form of the articulator may be used for grinding and shaping the cutting edges and planes of occlusion of the teeth, thus finishing the teeth so they will register and fit one with the other when placed for use in the patient's mouth.

Having thus described my invention, what I claim as new, and desire to secure by Letters-Patent is as follows:

1. In a dental machine for articulating teeth, the combination with a frame for holding a tooth cast, an articulator device comprising relative movable members for mounting another tooth cast for registry with the first named tooth cast, a shaft attached to one of the movable members for transmitting motion to the articulator device, and adjustable retaining planes engaging the articulator device for the purpose of confining the tooth casts in registry one with the other.

2. In a dental machine for articulating teeth, the combination with a frame for holding a tooth cast, an articulator device comprising relative movable members for mounting another tooth cast for registry with the first named tooth cast, a shaft attached to one of the movable members for transmitting motion to the articulator device, retaining means engaging the articulator device for the purpose of confining the tooth casts in registry one with the other, and adjusting means for varying the distance between the frame with its associate tooth cast and articulator with its mounted tooth cast such that casts of varying thickness and casts of varying tooth lengths may be inserted in the dental machine for articulation.

3. In a dental machine for articulating teeth, the combination with a frame for holding a tooth cast, an articulator device comprising relative movable members for mounting another tooth cast for registry with the first named tooth cast, a shaft attached to one of the movable members for transmitting motion to the articulator device, retaining means engaging the articulator device for the purpose of confining the tooth casts in registry one with the other, and adjusting means for varying the distance between the frame with its associate tooth cast and articulator with its mounted tooth cast such that casts of varying thickness and casts with varying tooth lengths may be inserted in the dental machine for articulation, and means for adjusting the retaining means such that tooth casts of varying diametrical size may be mounted upon the articulator device.

4. In an articulator machine comprising in combination, a base plate, a yoke mounted upon the base plate and adapted to securely hold a tooth cast, an articulator element movably related to the base, and a shaft journaled in the base and adapted to communicate articulating motion to the element from the hand of an operator.

5. In an articulator machine comprising in combination, a base plate, a yoke mounted upon the base plate and adapted to securely hold a tooth cast, an articulator element comprising a rotatable plate frictionally coöperating with a cast holder, and a hand motion means connected with the rotatable plate for communicating hand motion of an operator through said plate into the aforesaid articulator element.

6. In an articulator machine comprising in combination, a base plate, a yoke mounted upon the base plate and adapted to securely hold a tooth cast, an articulator element comprising a rotatable plate frictionally coöperating with a cast holder, and a hand motion means connected with the rotatable plate for communicating hand motion of an operator through said plate into the aforesaid articulator element, a means for impressing a gentle forward motion to the articulator element, and a set of guide planes for limiting the movement of the articulator element.

7. An articulator device for dental work, the combination with a base, a means supported on the base for firmly holding a tooth cast, an articulating shaft journaled in the base, a plate secured to the shaft, and a tooth cast holder confined on the plate and adapted to undergo articulating motion transmitted thereto from the plate.

8. An articulating or tooth grinding device comprising in combination, a base plate, a post mounted on the base plate, a yoke member for holding a tooth cast, said yoke supported on the post and adjustable in relation with said shaft, an articulator shaft journaled in the base, a rotatable plate fixed to the articulator shaft and movable vertically and rotatably by said articulator shaft, a cast holder plate loosely confined upon the rotatable plate and adapted to undergo movements transmitted thereto from said rotatable plate, and guide planes arranged to confine the cast holder to a predetermined range of articulating motion.

9. An articulating or tooth grinding device comprising in combination, a base plate, a post mounted on the base plate, a yoke member for holding a tooth cast, said yoke supported on the post and adjustable in relation with said post, an articulator post journaled in the base, a rotatable plate fixed to the articulator shaft and movable vertically and rotatably by said articulator shaft, a cast holder plate loosely confined upon the rotatable plate and adapted to undergo movements transmitted thereto from said rotatable plate, guide planes arranged to confine the cast holder to a predetermined range of articulating motion, and ball bearings disposed between the rotatable plate and cast holder for transmitting slight rotary motion from the plate to the holder.

10. An articulating or tooth grinding device comprising in combination, a base plate, a post mounted on the base plate, a yoke member for holding a tooth cast, said yoke supported on the post and adjustable in relation with said post, an articulator shaft journaled in the base, a rotatable plate fixed to the articulator shaft and movable vertically and rotatably by said articulator shaft, a cast holder plate loosely confined upon the rotatable plate and adapted to undergo movements transmitted thereto from said rotatable plate, guide planes arranged to confine the cast holder to a predetermined range of articulating motion, and ball bearings disposed between the rotatable plate and cast holder for transmitting slight rotary motion from the plate to the holder, and a means for imparting a slight forward motion to the cast holder plate causing it to move in contiguous relation with the guide planes.

11. An articulator device for dental mechanics comprising in combination, a base plate, a rocker arm pivoted thereon, a yoke for holding a tooth cast secured to the rocker arm, an articulator element, and means coöperating with the articulating element and the rocker arm for the purpose of actuating said element in simulating human jaw motion from aforesaid yoke when an operator manipulates the yoke.

12. An articulator device for dental mechanics comprising in combination, a base plate, a rocker arm pivoted thereon, a yoke for holding a tooth cast secured to the rocker arm, an articulator element, means coöperating with the articulating element and the rocker arm for the purpose of actuating said element in simulating human jaw motion from aforesaid yoke when an operator manipulates the yoke, and adjustable retaining planes for limiting the articulating motion of the element.

13. A dental articulator apparatus comprising in combination, a base plate, a rocker arm pivoted thereon, a cast holder yoke, an articulating element embodying a cast holder and a rotatable plate, an articulating shaft fixed to the rotatable plate, and a bell crank adapted to coöperate with the rocker arm and with the articulating shaft for transmitting motion from the cast holder yoke to the articulating element.

14. A dental articulator apparatus comprising in combination, a base plate, a rocker arm pivoted thereon, a cast holder yoke, an articulating element embodying a cast holder and a rotatable plate, an articulating shaft fixed to the rotatable plate, a bell crank adapted to coöperate with the rocker arm and with the articulating shaft for transmitting motion from the cast holder yoke to the articulating element, and a set of guide planes comprising members adjustably secured to the base for confining the range of operation of the articulator element such that the dental casts secured to the yoke and to the cast holder will register in a grinding relation one with the other.

WALTER J. WILSON.